(12) United States Patent
Perlowitz

(10) Patent No.: US 11,503,805 B2
(45) Date of Patent: Nov. 22, 2022

(54) CONTAINER FOR PET TREATS

(71) Applicant: Valerie W. Perlowitz, Fairfax, VA (US)

(72) Inventor: Valerie W. Perlowitz, Fairfax, VA (US)

( * ) Notice: Subject to any disclaimer, the term of this patent is extended or adjusted under 35 U.S.C. 154(b) by 826 days.

(21) Appl. No.: 15/390,263

(22) Filed: Dec. 23, 2016

(65) Prior Publication Data

US 2018/0178969 A1  Jun. 28, 2018

(51) Int. Cl.
*A01K 5/00* (2006.01)
*A01K 15/02* (2006.01)

(52) U.S. Cl.
CPC .............. *A01K 15/02* (2013.01); *A01K 5/00* (2013.01)

(58) Field of Classification Search
CPC .......... A01K 15/02; A01K 5/00; B65D 43/02; B65D 71/36; B65D 83/04; B65D 47/263; B65D 43/18; B65D 47/04; B65D 1/165; A45C 11/00
USPC ................ 206/270, 535, 536, 807, 833, 37; 215/208, 223, 309, 380, 383, 385; 220/4.01, 4.04, 4.07, 4.34, 8, 253, 661, 220/676, 608; 222/519, 524, 153.01; 221/519–521, 548, 553
See application file for complete search history.

(56) References Cited

U.S. PATENT DOCUMENTS

| | | | | |
|---|---|---|---|---|
| 1,137,642 A * | 4/1915 | Lingner | ................... | A24F 27/00 206/121 |
| 1,506,273 A * | 8/1924 | Smith | ..................... | B65H 75/16 19/159 R |
| 2,328,246 A * | 8/1943 | Albion | ................. | B65D 47/263 222/553 |
| 2,353,629 A * | 7/1944 | Apfelbaum | .......... | B65D 47/283 206/536 |
| 3,027,000 A * | 3/1962 | Kantrow | ............ | B65D 83/0409 206/536 |
| 4,613,063 A * | 9/1986 | Wright | ................. | B65D 47/265 220/270 |
| 4,971,203 A * | 11/1990 | Weinstein | .......... | B65D 83/0481 206/536 |
| 5,011,009 A * | 4/1991 | Scheurer | ................. | A24F 15/20 206/270 |
| 5,099,999 A * | 3/1992 | Balien | ................ | B65D 83/0481 206/536 |

(Continued)

*Primary Examiner* — Anthony D Stashick
*Assistant Examiner* — Raven Collins
(74) *Attorney, Agent, or Firm* — Birch, Stewart, Kolasch & Birch, LLP

(57) ABSTRACT

The silent pet treats dispenser has a bottom wall with a sidewall extending upwardly from the bottom wall. The sidewall is provided with an aperture. A closure attaches to a top end of the sidewall and has a flange extending inside of the container. The flange has an aperture with the same size and shape as the aperture in the container sidewall. The closure can be silently rotated from a first position where the aperture in the flange aligns with the aperture in the sidewall to a second position where the apertures are not aligned. In the first position, the aperture in the sidewall is closed, preventing dispensing of the contents of the container. A tab extends from the flange and through the aperture in the sidewall to facilitate movement of the closure from the first position to the second open position.

7 Claims, 5 Drawing Sheets

(56) References Cited

U.S. PATENT DOCUMENTS

| | | | | |
|---|---|---|---|---|
| 5,123,574 A * | 6/1992 | Poulos | ............... | B65D 83/0409 |
| | | | | 215/253 |
| 5,157,180 A * | 10/1992 | West | ...................... | B01J 29/084 |
| | | | | 585/313 |
| 5,158,180 A * | 10/1992 | Zucker | ............... | A47K 10/3818 |
| | | | | 206/210 |
| 6,631,800 B1 * | 10/2003 | Keeven | ................. | A01M 31/00 |
| | | | | 206/37 |
| D580,274 S * | 11/2008 | Abel | ............................. | D9/689 |
| 8,136,687 B2 * | 3/2012 | Wu | ......................... | A61J 7/04 |
| | | | | 220/254.1 |
| 2003/0209558 A1 * | 11/2003 | Cross | ................ | B65D 83/0463 |
| | | | | 221/25 |
| 2007/0241134 A1 * | 10/2007 | Gurrisi | ................. | B65D 83/384 |
| | | | | 222/153.11 |
| 2008/0290110 A1 * | 11/2008 | Gelardi | .............. | B65D 83/0409 |
| | | | | 221/266 |
| 2014/0299632 A1 * | 10/2014 | Py | ......................... | A45D 34/04 |
| | | | | 222/213 |

* cited by examiner

CONTAINER FOR PET TREATS

BACKGROUND OF THE INVENTION

Pet owners often provide treats to pets, particularly dogs, to reinforce positive behavior and as an aid in behavioral training. Different treats come in various sizes and are often carried by the pet owner when walking a dog. Prior art containers for holding pet treats are typically made of flexible nylon material having an opening secured with a Velcro closure. For convenience, the container for pet treats is attachable to the owner's belt. However, Velcro and other closures make audible noise when opened, confusing behavioral training between the noise made by the closure and training commands, including but not limited to a clicker. Also, the flexible nature of the pet container does not protect the treats from external impacts, which are particularly common when worn on a belt. The result is the disintegration of treats within the bag, resulting in the container needing to be cleaned. Moreover, the owner must place the hand within the bag in order to retrieve treats to provide to the dog. This is particularly undesirable when the container becomes full of crumbs.

It is an object of the invention that the container does not make any sound when being opened or when the aperture is changed.

It is an object of the invention to provide a container for pet treats which protects treats contained therein from external impacts.

It is another object of the invention to provide a container for pet treats that has an easy and silent open and closed positions.

It is yet another object of the invention to provide a container for pet treats that allows dispensing of treats without having to place your hand with in the container.

It is another object of the invention to provide a container for pet treats having a closure which is rotatable between an open configuration and a closed configuration.

It is yet another object of the invention to provide a container for multiple sized treats that can be dispensed by changing the aperture of the opening.

It is another object of the invention to see the amount of treats left in the container.

These and other object invention are apparent to one of ordinary skill in the art after reading the disclosure of the invention.

SUMMARY OF THE INVENTION

The silent pet treats dispenser has a bottom wall with a sidewall extending upwardly from the bottom wall. The sidewall is provided with an aperture. A closure attaches to a top end of the sidewall and has a flange extending inside of the container. The flange has an aperture with the same size and shape as the aperture in the container sidewall. The closure can be silently rotated from a first position where the aperture in the flange aligns with the aperture in the sidewall and a second position where the apertures are not aligned. In the first position, the aperture in the sidewall is closed, preventing dispensing of the contents of the container. A tab extends from the flange and through the aperture in the sidewall to facilitate movement of the closure from the first position to the second open position.

DETAILED DESCRIPTION OF THE INVENTION

Figure 1:
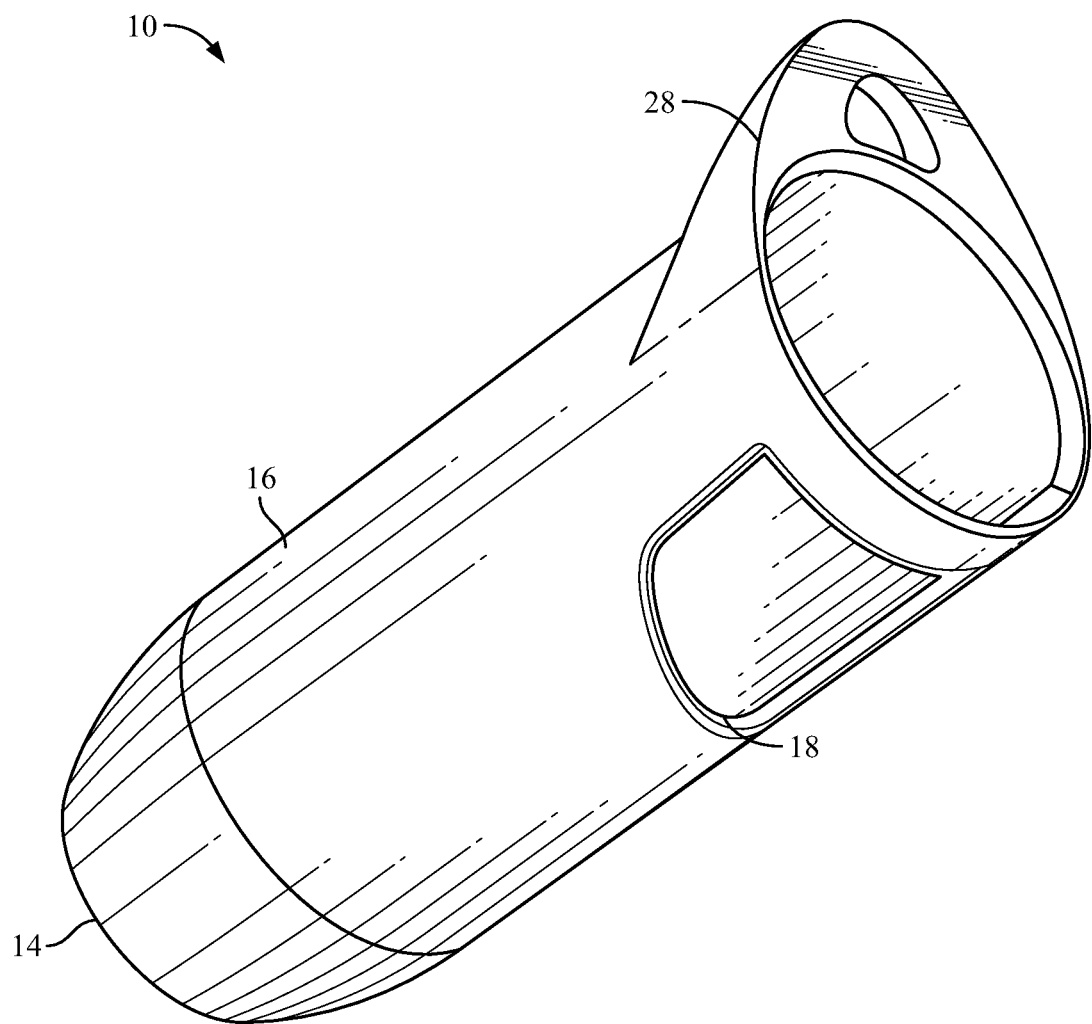
FIG. 1 is a perspective view of the container.
Figure 2:
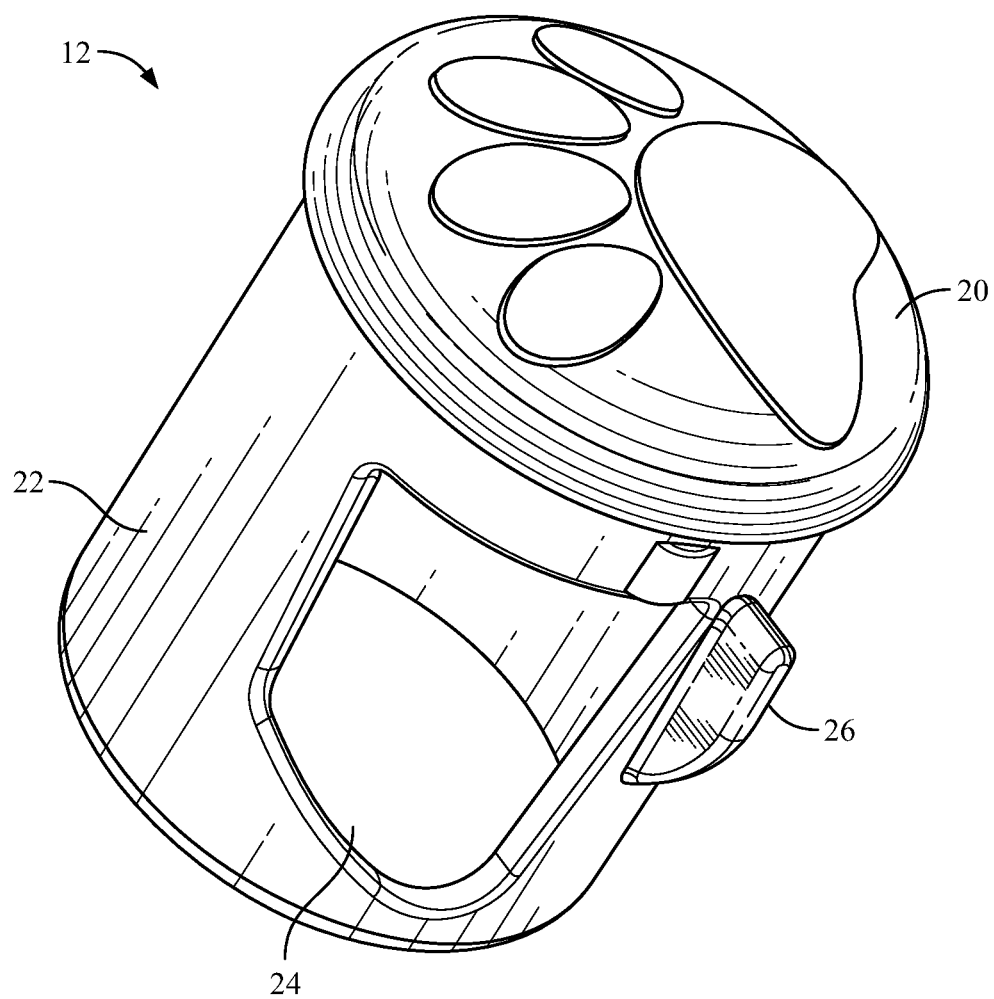
FIG. 2 is a perspective view of the closure.

FIG. 1 depicts the container 10 having a bottom wall 14 and a sidewall 16 extending upwardly from the bottom wall 14. The sidewall 16 forms an open top for the container 10. A first aperture 18 is formed in the sidewall 16 at a location below a top edge of the sidewall. FIG. 2 depicts closure 12 having a top wall 20 and a flange 22 extending downwardly from the top wall 20. A second aperture 24 is formed in the flange 22 at a location below the top edge of the flange 22. The location of the second aperture 24 is such that when the closure 12 is placed within the container 10, the second aperture 24 of the closure 12 is aligned with the first aperture 18 of the sidewall 16. A tab 26 at an edge of the second aperture 24 extends outwardly from the flange 22. The function of the tab 26 will be described later.

The container 10 is made of plastic which may be rigid or flexible, and is able to withstand external impacts without collapsing, thereby causing damage to the contents. A handle 28 extends from the sidewall 16 and provides a convenient attachment point for the container 10 to be attached to a user's belt or a leash. The container 10 can be made of translucent or clear material to allow the user to know how many treats are left in the container. The closure 12 creates an airtight container, preventing treats from going bad due to exposure to air.

Figure 3:
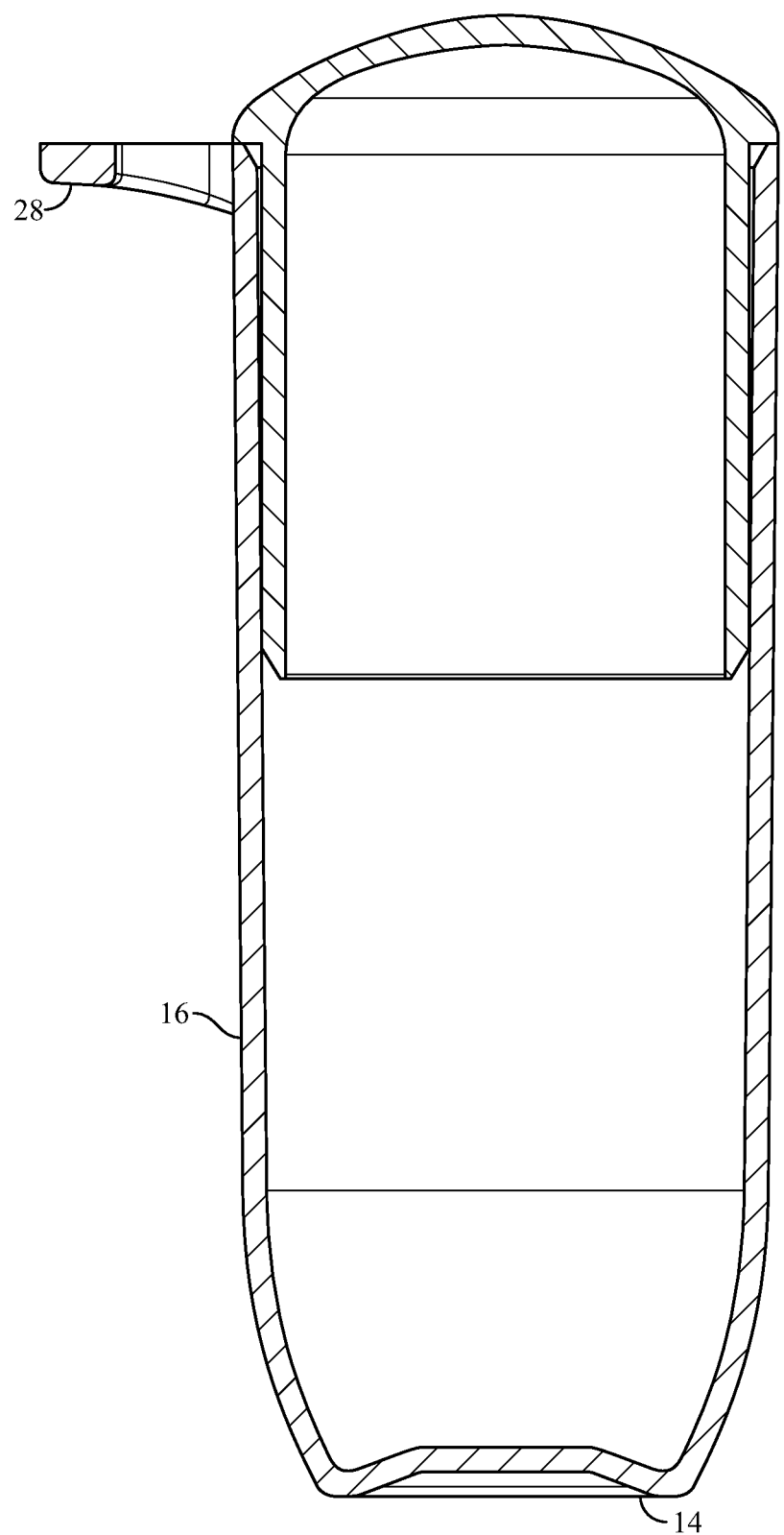
FIG. 3 is a cross-sectional view of the container and closure.

FIG. 3 depicts a cross-sectional view of the closure 12 inserted within the container 10. As seen in the cross-sectional view, the flange 22 fits within the container 10 such that the outer surface of the flange 22 contacts the inner surface of the sidewall 16. The frictional force between the flange 22 and container 10 retains the closure 12 in position relative to the container 10 absent a force applied to the closure.

Figure 4:
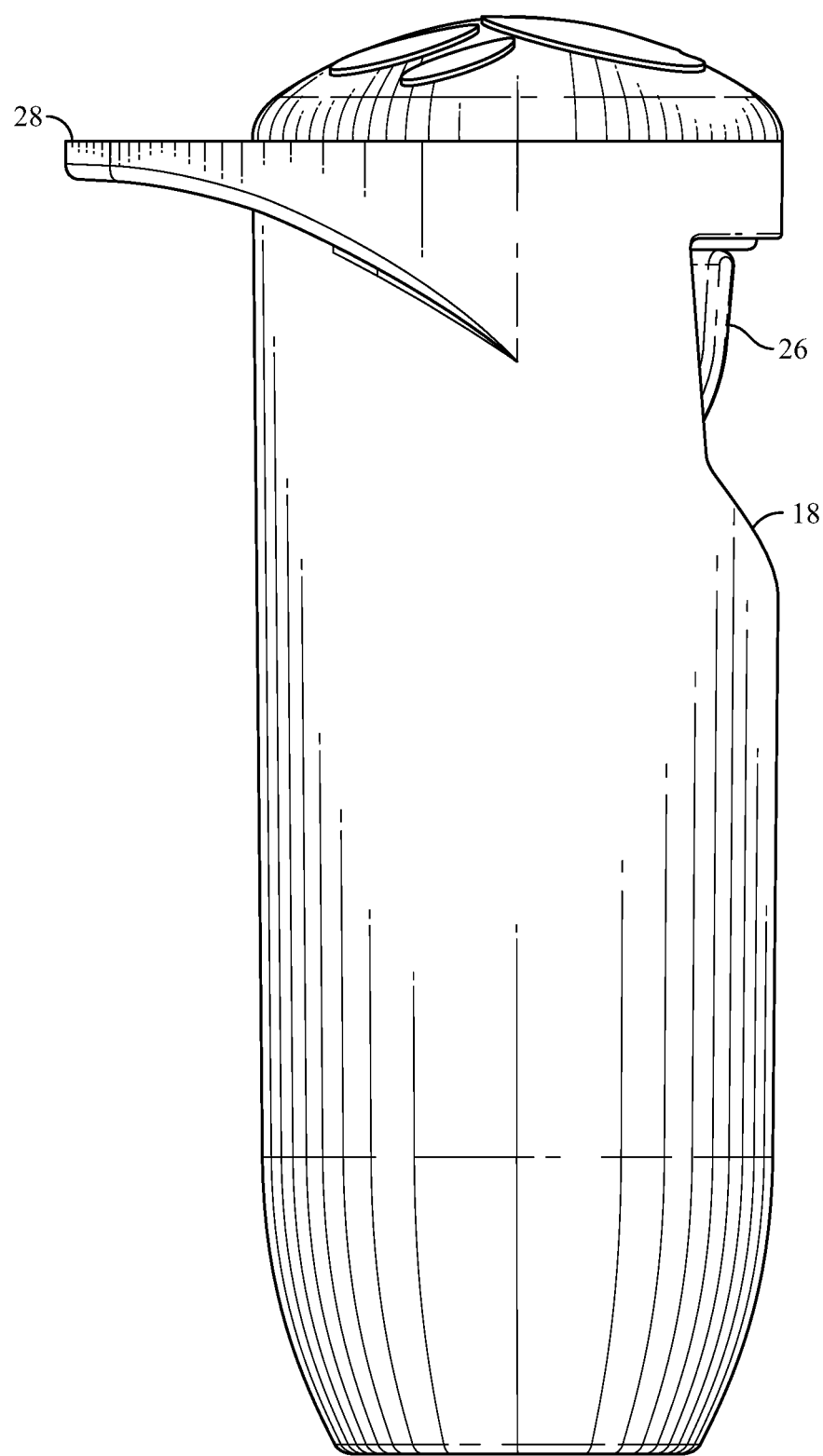
FIG. 4 is a side view of the container and closure in the closed position.
Figure 5:
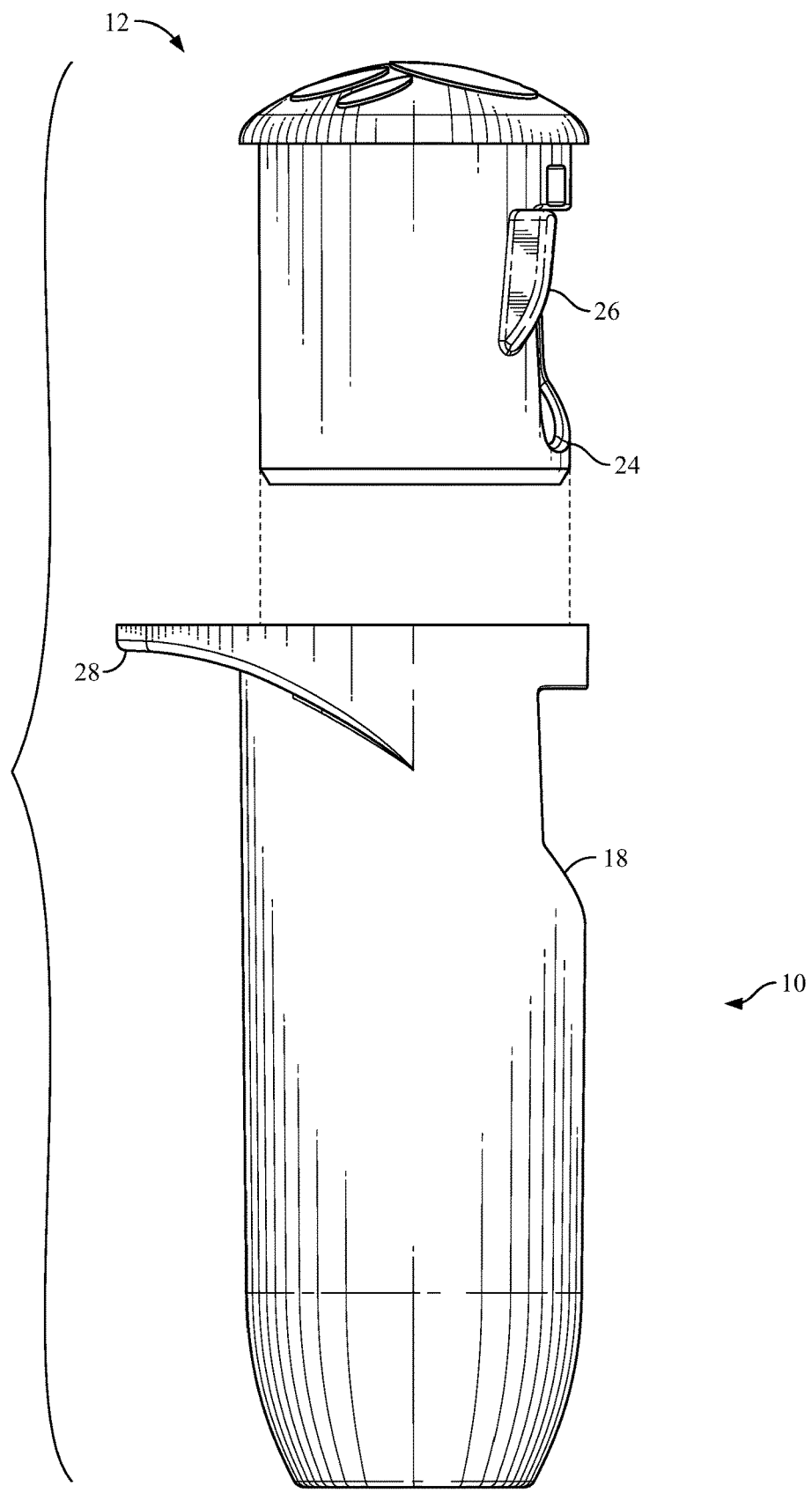
FIG. 5 is a side view of the container and closure in the open position.

FIG. 4 depicts the container 10 with the closure 12 in the closed position. The tab 26 on flange 22 extends through the first aperture 18 in the sidewall 16 of the container 10. When the tab 26 is against the left side of the first aperture 18, a portion of the flange 22 covers the first aperture 18, as the first aperture 18 of the container 10 and the second aperture 18 in the closure 12 are not in registry. However, if the user moves the tab 26 to the right side of the first aperture 18, as seen in FIG. 5, the closure 12 rotates within the container 10 and the first aperture 18 in the container 10 and second aperture 18 of the closure 12 are in registry. This allows the contents of the container to be to be dispensed through the aligned apertures without the user having to place a hand within the container.

The closure 12 can be moved from the closed configuration to the open configuration without making any noise, which doesn't confuse the dog between container noise and the behavior which is being trained to the dog. In addition, the apertures allow for the easy dispensing of the desired number of treats. The container can be made in a variety of sizes to hold a wide variety of sized treats.

I claim:

1. A container, comprising:
a bottom wall;

a sidewall extending upwardly from the bottom wall, the sidewall having a circular cross section;

a first aperture in the sidewall;

a closure, the closure having a top wall and a flange depending from the top wall, the top wall having a shoulder extending radially outwardly from the flange;

a second aperture in the flange; and a tab extending from the flange, wherein the flange extends inside of the sidewall and a bottom surface of the shoulder contacts a top edge of the sidewall when the closure is placed on the sidewall, wherein the closure has a first position and a second position, the first aperture and second aperture being aligned in the first position and the first aperture and second aperture not aligned in the second position so that the flange closes the first aperture, wherein the tab extends through the first aperture in the sidewall, and wherein the tab is adjacent to a side edge of the second aperture.

2. The container of claim 1, wherein the first aperture and second aperture have a same size and same shape.

3. The container of claim 1, wherein the closure rotates between the first position and the second position.

4. The container of claim 1, wherein the first aperture has a first side edge and a second side edge, and wherein the first side edge is shorter than the second side edge.

5. The container of claim 1, wherein the top wall of the closure has a convex top surface, a peripheral edge of the top surface joining a peripheral edge of the shoulder.

6. The container of claim 1, wherein the top wall of the closure has a bottom surface and a top surface with a peripheral edge, wherein the flange extends downwardly from the bottom surface of the top wall and is spaced radially inwardly of the peripheral edge of the top surface of the top wall, wherein the bottom surface of the top wall between the flange and peripheral edge of the top surface of the top wall forms the shoulder.

7. The container of claim 6, wherein the top surface of the top wall is convex.

* * * * *